1,879,959

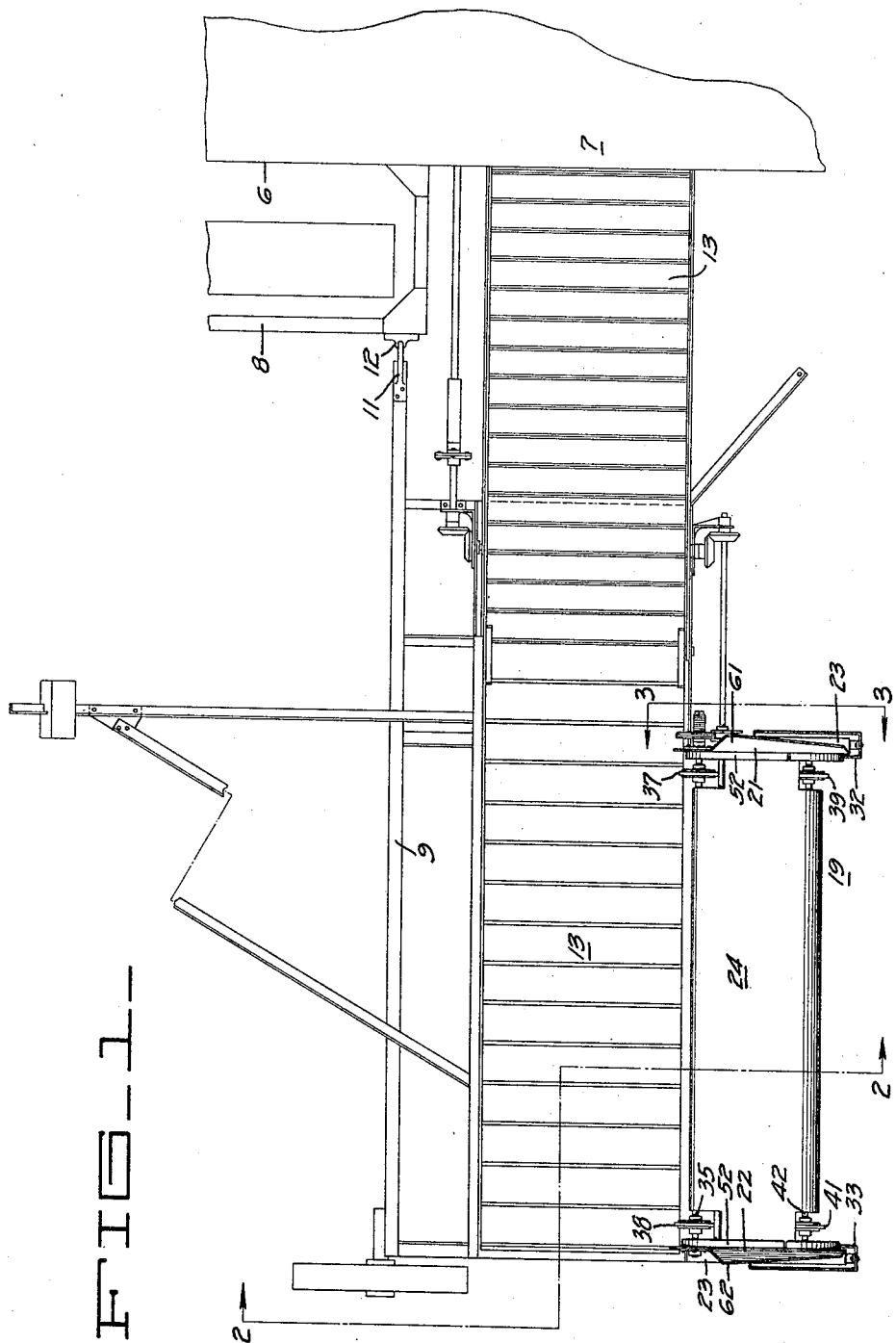
Sept. 27, 1932.  L. H. THOEN  1,879,959
HARVESTER PICK-UP
Filed Feb. 26, 1929  3 Sheets-Sheet 1
INVENTOR
Lowell H. Thoen
BY
ATTORNEYS Sept. 27, 1932. L. H. THOEN 1,879,959
HARVESTER PICK-UP
Filed Feb. 26, 1929 3 Sheets-Sheet 2
FIG_2_
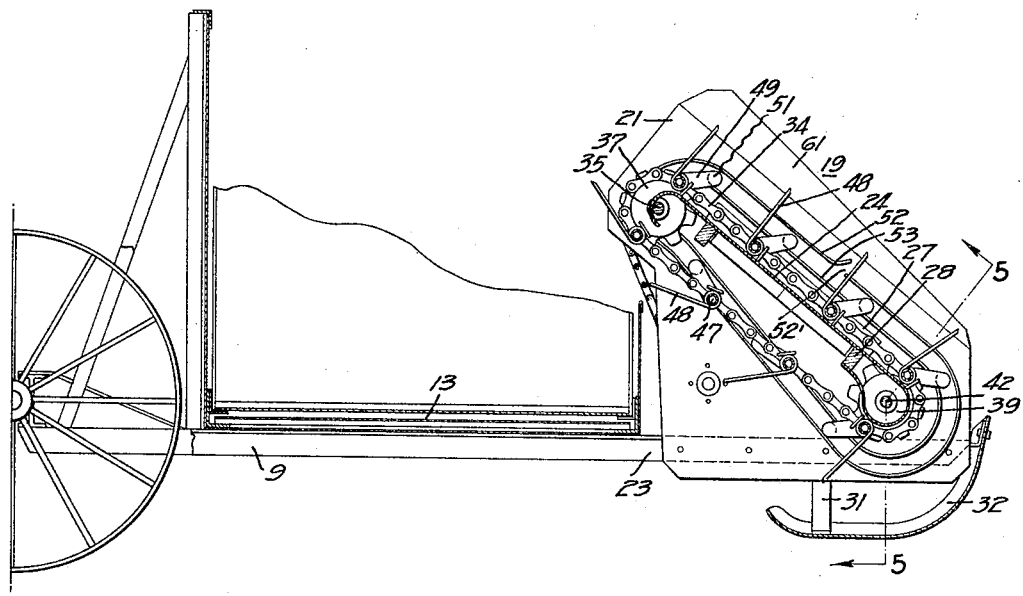
FIG_4_ FIG_3_
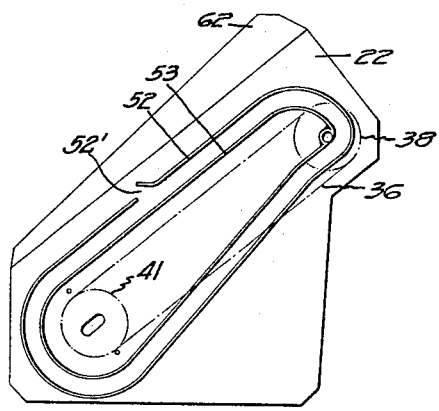 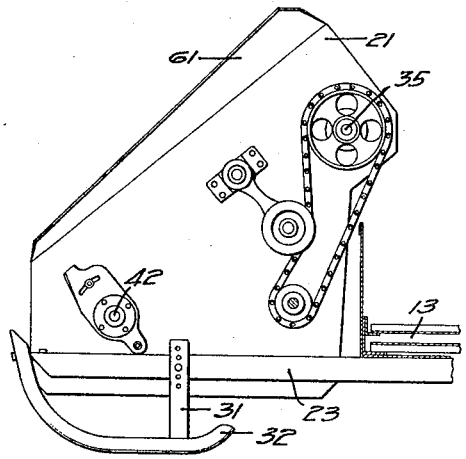
INVENTOR
Lowell H. Thoen
BY White, Prost & Fryer
ATTORNEYS Sept. 27, 1932.　　　L. H. THOEN　　　1,879,959
HARVESTER PICK-UP
Filed Feb. 26, 1929　　3 Sheets-Sheet 3
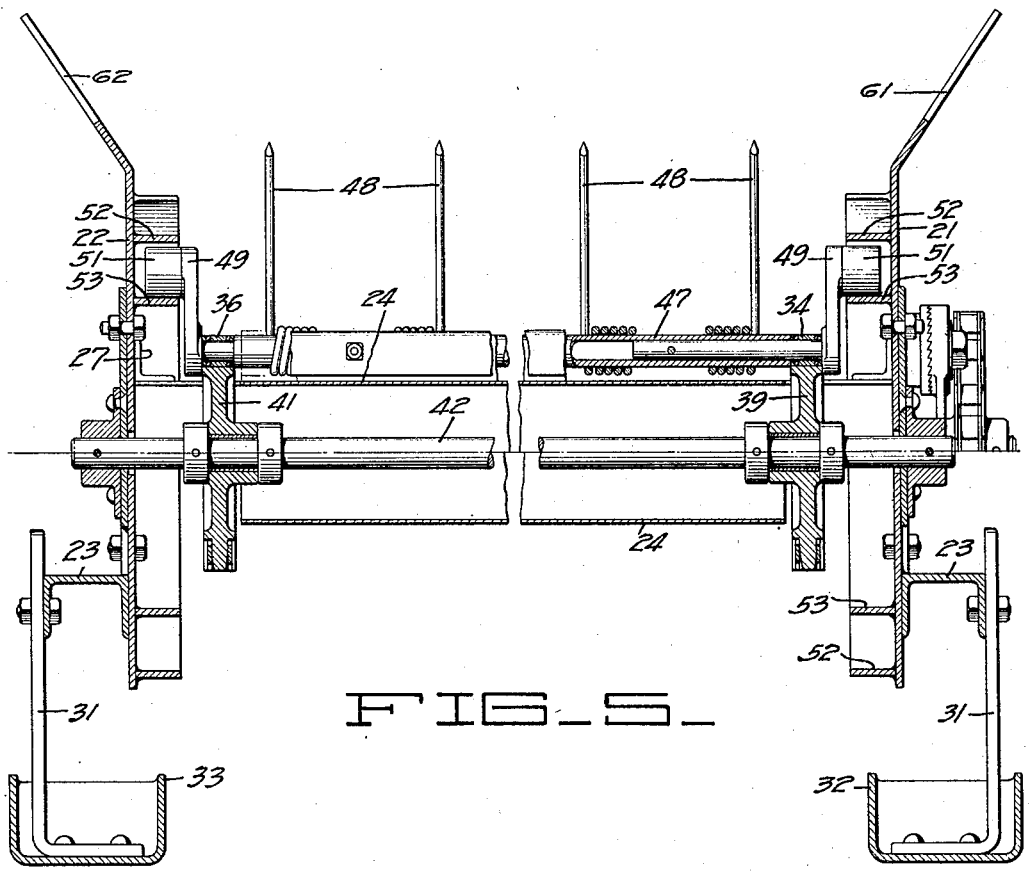
FIG_5_
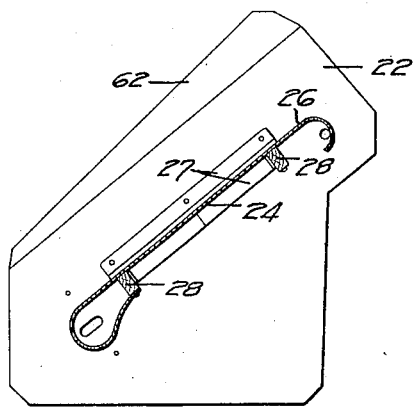
FIG_6_
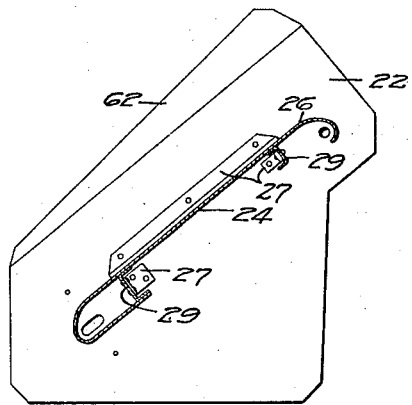
FIG_7_
INVENTOR
Lowell H. Thoen
BY White, Prost & Fryer
ATTORNEYS Patented Sept. 27, 1932

UNITED STATES PATENT OFFICE

LOWELL H. THOEN, OF STOCKTON, CALIFORNIA, ASSIGNOR TO CATERPILLAR TRACTOR CO., OF SAN LEANDRO, CALIFORNIA, A CORPORATION OF CALIFORNIA

HARVESTER PICK-UP

Application filed February 26, 1929. Serial No. 342,866.

My invention relates generally to harvesting machinery particularly to that type of mechanism usually termed "pick-up feeders", examples of which are disclosed in the copending applications of Jacob Clove, Serial No. 186,138, filed April 23rd, 1927, and Elmer E. Wickersham, Serial No. 249,006, filed January 24th, 1928.

It has been found expedient in harvesting and handling grain to cut the grain and to leave it unthreshed upon the field. The grain so handled may be left either broadcast over the field, lying on the ground in windrows, or may be gathered together in shocks. Later the grain is gathered by a pick-up mechanism which is driven over the field and the collected grain is conveyed to a separating or threshing mechanism. This method of operation has particular advantages when the grain to be harvested is in a green or wet condition, or is largely interspersed with weeds. By remaining upon the field after it has been cut, the grain dries out and the kernels are more readily separated from the fibrous portions thereof.

The strain and difficulty presented to the pick-up mechanism in traveling over the field and gathering in the grain, particularly where bundles or shocks of grain are to be handled, are extremely severe and rigorous. The intermittent handling of a large number of shocks and the bumping over the normally rough ground are not conducive to the long life and efficient operation of the pick-up mechanism.

It sometimes happens that in picking up the grain, particularly when shocks are being handled, some of the grain will fall outside of the mechanism for conveying away the picked up grain.

It is therefore an object of my invention to provide a means for facilitating the gathering of the grain.

Another object of my invention is to provide a means for materially lengthening the life of the pick-up mechanism.

A further object of my invention is to provide a materially lighter and stronger pick-up construction.

The invention possesses other advantageous features, some of which with the foregoing will be set forth at length in the following description where I shall outline in full that form of the harvester pick-up of my invention, which I have selected for illustration in the drawings accompanying and forming part of the present specification. In said drawings I have shown one form of the harvester pick-up embodying my invention, but it is to be understood that I do not limit myself to such form since the invention, as set forth in the claims, may be embodied in a plurality of forms.

In the drawings to which I have made reference, Figure 1 is a plan view of a pick-up mechanism embodying the device of my invention.

Figure 2 is a cross section along the line 2—2 of the device shown in Figure 1.

Figure 3 is a side elevation, along the line 3—3 of Figure 1, of an end board of a pick-up feeder.

Figure 4 is a side elevation of a portion of the pick-up feeder mechanism which co-operates directly to guide the passage of the pick-up.

Figure 5 is a cross section along the section line 5—5 through the embodiment of my invention shown in Figure 2.

Figure 6 is a side elevation of an end board showing the details of construction of the center board.

Figure 7 is also a side elevation of an end board showing the details of construction of a modification of the center board.

The pick-up of my invention preferably comprises a carriage adapted to be driven over a field in which cut grain is disposed, the carriage being provided with an improved means for gathering the grain.

The embodiment of the pick-up feeder of my invention, which I have disclosed in the drawings, is adapted to be attached to the separator portion 6 of a combined harvester, which may be of any of the standard makes. The separator, which ordinarily includes a feeder house 7 leading to suitable threshing machinery, is suitably mounted on a frame 8 supported by the usual ground wheels. The pick-up feeder usually comprises a suitable frame 9, ordinarily made of metal shapes such as angles and channels, and is attached at its inner end by a hook 11 to an eye 12 secured to the framework of the threshing mechanism. Coactively disposed with respect to the feeder house 7 is a draper 13 which is arranged to travel along the main frame of the pick-up and convey the grain discharged upon it to the feeder house. This draper may be of any of the well known standard constructions.

To pick up the grain upon the field a pick-up frame-work 19 is mounted upon the main frame of the mechanism. This pick-up framework usually includes a pair of end boards 21 and 22 which are expediently rigidly fastened to extending frame members 23. The end boards are joined together by a center board 24. As is shown in Figures 6 and 7 the center board is manufactured of a heavy sheet metal plate 26, the end portions of which are arcuately shaped. The center board is usually attached to the end boards by means of angles 27 and supported by means of strips 28 or channels 29. The pick-up frame work is thus preferably composed of essentially the end boards affixed directly to the heavy center board. This construc-materially simplifies the pick-up mechanism, eliminating the bracing, which has heretofore been provided, while providing a stronger construction.

The lower end of the pick-up framework 19 is preferably supported by arms 31 adjustably attached to the frame 23 and to skids 32 and 33. The skids are preferably of arcuate, concave contour and are adjustably secured to the extending frame members 23 of the main frame 9. By suitably adjusting the arms 31, the height of the leading edge of the pick-up framework can be readily adjusted with respect to the ground.

Mounted between the end boards 21 and 22 and passing over the center board 24 is a conveyor ordinarily termed a "pick-up." The conveyor preferably comprises two end chains 34 and 36 at their upper ends passing around sprockets 37 and 38 which are affixed to axle 35 and at their lower ends, passing around the sprockets 39 and 41 secured to axle 42 journalled in the lower portion of the end boards 21 and 22. Journalled in irregular links in the chain are parallel bars 47. Several tangs 48 are fixed in the bars 47 at regular intervals to project generally tangentially therefrom. The tangs are effective to engage the grain lying broadcast on the field or to engage shocks of grain which are arranged in stacks.

To provide a proper motion for the tangs as they come into position for engaging bundles of grain, the bars 47, which are rotatable within the chains 34 and 36, are, at their extremities, provided with cranks 49 having end rollers 51 running between pairs of strips 52 and 53 forming tracks on the end boards 21 and 22. The track encompasses the path of the chain but deviates slightly therefrom in a predetermined amount so that the cranks are effective to rotate the bars 47 within the irregular chain links to turn the tangs 48 to the proper position for actively engaging the grain.

The foregoing description is of a pick-up mechanism largely similar to the one disclosed in the above identified copending applications of Jacob Clove and Elmer E. Wickersham.

As has been heretofore set forth the pick-up mechanism in travelling over the field and gathering up irregular quantities of grain is subject to severe stresses. It is the usual practice to affix angles by means of bolting or riveting to form the tracks on the end boards 21 and 22 for the passage of the rollers. This arrangement is not satisfactory inasmuch as it is practically impossible to secure an attachment which is truly rigid and provides a path which was substantially constant at all times.

Furthermore, the formation of the angle into a shape having the desired path for the crank rollers is an extremely difficult and costly item of manufacture. It is also expedient to provide a track possessing the wear resisting qualities resulting from an adequate heat treatment. Such a treatment is not as readily and as thoroughly accomplished when the track is formed of angles as with one formed of strips. The severe jarring and the heavy intermittent loads cause the bolts or rivets to work loose and deviations in the path provided by the track occur. This results in the incorrect rotation of the rollers on the cranks and causes the tangs to assume such a position that grain is not efficiently handled. Likewise difficulty is occasioned in attaching the track to the side board at the lower extremities adjacent to the skids so that a very low position of the pick-up mechanism relative to the ground can be secured for picking up grain which is very closely matted down.

I have therefore provided tracks formed by strips 52 and 53 integral with the side boards 21 and 22. This I preferably accomplish by welding the strips directly to the side boards, expediently by electrical means. The tracks when so affixed do not become loosened or deviate substantially from their fixed position from any stresses occasioned by picking up heavy loads of grain or from severe handling of the pick-up mechanism. This method of fastening also serves to reduce the weight of the pick-up mechanism for the thickness of the side boards used may be substantially reduced while the same strength is preserved, for it is not necessary to provide the numerous rivet or bolt holes to affix the angles. To enable the chains together with the tang bars to be removed without disturbing any of the supporting parts, the outer strip 52 is provided with an opening 52′ through which crank rollers 51 can be passed after the chain is parted. By this construction it is also possible to assemble the supporting framework and then to mount the chains on the sprockets by passing the rollers through the openings 52′.

As I have previously set forth, at times difficulty is encountered in discharging the grain upon the draper due to the misalignment of the grain with the pick-up mechanism. I have therefore provided a means for securing and facilitating the more efficient feeding and discharging of the grain onto the draper which, in turn discharges the grain into the feeder house. Thus I have expediently provided the end boards 21 and 22 with flared edges 61 and 62 which assist in confining the grain. When a large mass of grain is being carried by the pick-up to the draper the flared edges of the end boards provide a suitable means for retaining it on the pick-up. With the usual unflared ends, the grain, especially when handled intermittently, is frequently lost over the side when a large quantity is on the pick-up.

I claim:

1. A conveyor, comprising, a supporting framework including a side member, shafts supported by said side member, sprockets on said shafts, a chain on said sprockets, tang bars supported in said chain and provided with cranks, and a guide for said cranks consisting of a strip of metal welded to said side member.

2. A conveyor, comprising, a supporting framework including a side member, shafts supported by said side member, sprockets on said shafts, a chain on said sprockets, tank bars supported in said chain and provided with cranks, and a guide for said cranks consisting of a continuous strip of metal encompassing said shafts and welded to said side member.

3. A conveyor, comprising, a supporting framework including a side member, shafts supported by said side member, sprockets on said shafts, a chain on said sprockets, tang bars supported in said chain and provided with cranks, and guides for said cranks consisting of a pair of strips of metal welded to said side member.

4. A conveyor, comprising, a supporting framework including a pair of side members, shafts supported by said side members, sprockets on said shafts, chains on said sprockets, tang bars supported in said chains and provided with cranks, and guides for said cranks consisting of a pair of strips of metal encompassing said shafts and welded to each side member, one strip of each pair of strips having an opening for passage of said cranks.

5. A conveyor, comprising, a supporting framework including a pair of side members, shafts supported by said side members, sprockets on said shafts, chains on said sprockets, tank bars supported in said chain and provided with cranks, and guides for said cranks consisting of a pair of strips encompassing said shafts and secured to each side member, one strip of each pair of strips having an opening for passage of said cranks.

6. In a pick-up, a side member, and an endless guide track secured to said member, said track comprising a pair of spaced strips one of which is provided with an opening.

7. In a pick-up, a metal side member, an endless metal guide track welded to said side member, said track comprising a pair of spaced metal strips one of which is provided with an opening.

8. In a pick-up, a metal side member, and an endless guide track carried by said side member, said track including a continuous strip of metal forming an enclosed pathway and welded to said side member.

9. In a harvester, a pick-up comprising a metal side member, and a metal guide strip for a pick-up element welded directly to said side member.

10. In a harvester, a pick-up comprising a metal side member, and an endless guide track for a pick-up element, said track including a pair of spaced metal strips welded directly to said side member.

11. In a harvester, a pick-up comprising a metal side member, and a guide track for a pick-up element, said track including a metal strip integrally united with said side member by molecular union.

In testimony whereof, I have hereunto set my hand.

LOWELL H. THOEN.